US009958053B2

(12) United States Patent
Morizono

(10) Patent No.: US 9,958,053 B2
(45) Date of Patent: May 1, 2018

(54) REDUCTION GEAR

(71) Applicant: KOMATSU LTD., Tokyo (JP)

(72) Inventor: Ken Morizono, Hirakata (JP)

(73) Assignee: KOMATSU LTD., Tokyo (JP)

( * ) Notice: Subject to any disclaimer, the term of this patent is extended or adjusted under 35 U.S.C. 154(b) by 210 days.

(21) Appl. No.: 14/903,612

(22) PCT Filed: Mar. 6, 2015

(86) PCT No.: PCT/JP2015/056742
§ 371 (c)(1),
(2) Date: Jan. 8, 2016

(87) PCT Pub. No.: WO2016/006271
PCT Pub. Date: Jan. 14, 2016

(65) Prior Publication Data
US 2016/0258526 A1 Sep. 8, 2016

(51) Int. Cl.
*F16H 57/04* (2010.01)
*F16H 57/029* (2012.01)
*F16H 1/28* (2006.01)
*B60K 7/00* (2006.01)
*B60K 17/04* (2006.01)
*F16H 37/04* (2006.01)

(52) U.S. Cl.
CPC ....... *F16H 57/0424* (2013.01); *B60K 7/0015* (2013.01); *B60K 17/046* (2013.01);
(Continued)

(58) Field of Classification Search
CPC .... F16H 57/0424; F16H 57/029; F16H 57/04; B60K 17/046
See application file for complete search history.

(56) References Cited

U.S. PATENT DOCUMENTS 4,488,729 A * 12/1984 Story ................. E21B 3/02
277/408
4,730,833 A * 3/1988 Foster ................ F16H 57/029
277/637
(Continued)

FOREIGN PATENT DOCUMENTS

JP 3-78167 U 8/1991
JP 2002-22095 A 1/2002
(Continued)

OTHER PUBLICATIONS

International Search Report for the corresponding international application No. PCT/JP2015/056742, dated Mar. 6, 2015.

*Primary Examiner* — Stacey Fluhart
(74) *Attorney, Agent, or Firm* — Global IP Counselors, LLP

(57) ABSTRACT

A reduction component is linked to the output shaft of a hydraulic motor, and reduces the rotational speed of the hydraulic motor. A housing component has a rotation-side housing that is rotated around a horizontal rotational axis by the rotation of the hydraulic motor whose speed has been reduced by the reduction component, and a stationary-side housing that rotatably supports the rotation-side housing. The housing component houses the reduction component. A sealing component is disposed inside a gap between the rotation-side housing and the stationary-side housing, and seals the gap. An oil splasher splashes up lubricating oil to provide the lubricating oil to the upper part of the sealing component. The oil splasher has a plurality of concave components formed in the portion of the rotation-side housing facing a seal disposition space in which the sealing component is disposed.

10 Claims, 11 Drawing Sheets

(52) U.S. Cl.
CPC ............ *F16H 1/28* (2013.01); *F16H 57/029* (2013.01); *F16H 57/04* (2013.01); *B60K 2007/0038* (2013.01); *B60K 2007/0092* (2013.01); *B60Y 2200/25* (2013.01); *B60Y 2200/411* (2013.01); *F16H 37/041* (2013.01)

(56) References Cited

U.S. PATENT DOCUMENTS

| | | | |
|---|---|---|---|
| 2007/0295557 A1* | 12/2007 | Aldridge | F16C 33/6651 184/13.1 |
| 2008/0164100 A1* | 7/2008 | Iraha | F16H 57/0424 184/6.4 |
| 2011/0200282 A1* | 8/2011 | Shinohara | B60K 17/046 384/462 |
| 2012/0202640 A1 | 8/2012 | Morimoto | |
| 2015/0298502 A1* | 10/2015 | Ogahara | B60T 5/00 301/6.4 |

FOREIGN PATENT DOCUMENTS

| | | |
|---|---|---|
| JP | 2003-49930 A | 2/2003 |
| JP | 2005-48864 A | 2/2005 |
| JP | 2009-68506 A | 4/2009 |
| JP | 2010-242877 A | 10/2010 |
| WO | 2011/062172 A1 | 5/2011 |

\* cited by examiner

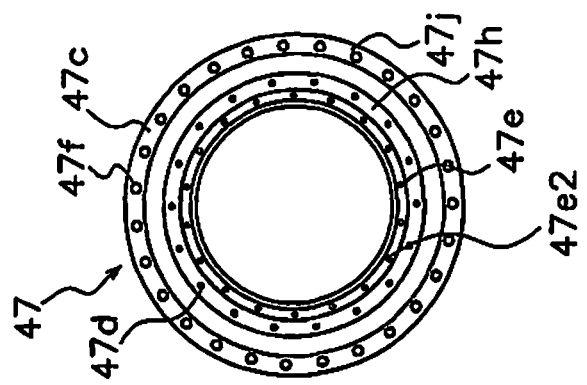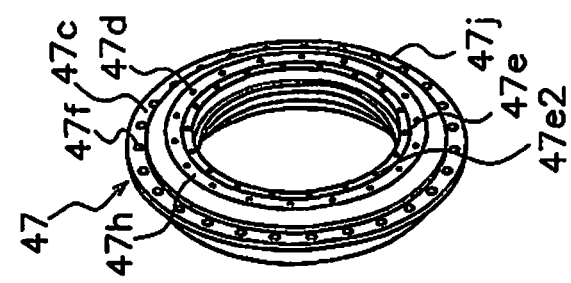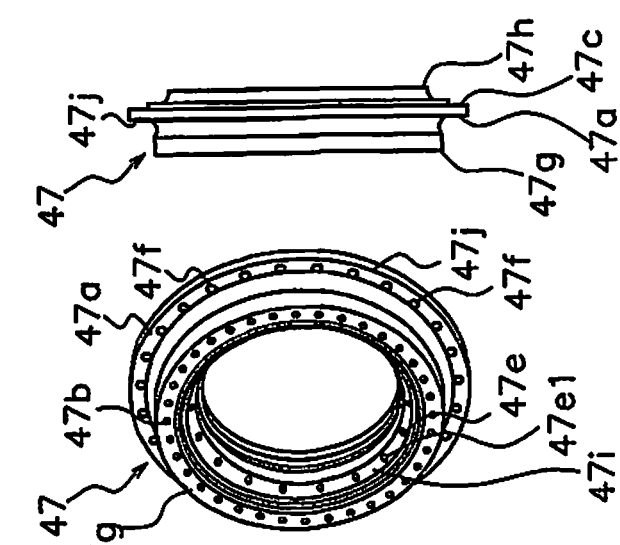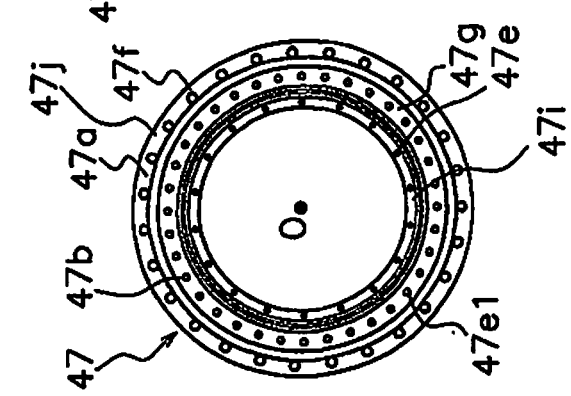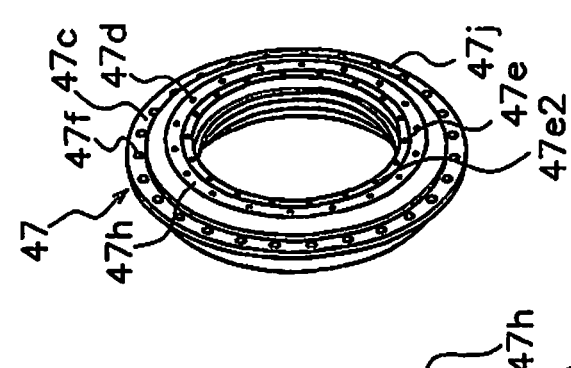

REDUCTION GEAR

CROSS-REFERENCE TO RELATED APPLICATIONS

This application is a U.S. National stage application of International Application No. PCT/JP2015/056742, filed on Mar. 6, 2015.

BACKGROUND

Field of the Invention

The present invention relates to a reduction gear. A reduction gear on which a sprocket wheel is mounted is often used in an endless track type travel apparatus of hydraulic excavators, bulldozers, and other such work vehicles (see Japanese Laid-Open Patent Application 2003-49930, for example).

With the final reduction gear discussed in Japanese Laid-Open Patent Application 2003-49930, an O-ring and a floating seal are used as a sealing component for sealing between a stationary housing and a rotating housing. A lubricating oil sump is provided to the upper part of the final reduction gear to cool the sealing component. A pipe is provided from the lubricating oil sump to the lower part of the sealing component, and the lubricating oil is supplied by gravity to the sealing component. The lubricating oil supplied to the lower part of the sealing component is also supplied to the upper part of the sealing component by rotation.

SUMMARY

With the conventional reduction gear discussed above, however, when the space in which the sealing component is disposed is tight, the lubricating oil may not be adequately supplied from the lower part to the upper part of the sealing component. When the supply of lubricating oil is inadequate, the upper part of the sealing component will not be sufficiently cooled.

In light of the problems encountered with conventional reduction gears, it is an object of the present invention to provide a reduction gear with which lubricating oil can be supplied all the way around the sealing component.

The reduction gear pertaining to a first aspect of the present invention comprises a reduction component, a housing component, a sealing component, and a concave component. The housing component has a first housing and a second housing. The first housing is rotated around a horizontal rotational axis by the rotation of an output shaft of a driver. The second housing rotatably supports the first housing. The reduction component is housed in the housing component, reduces the rotational speed of the driver, and transmits the rotation to the first housing. The sealing component is disposed between the first housing and the second housing. The concave component is located more to the outside in the radial direction than the sealing component, is spatially linked to the first housing side of the sealing component, and is formed in the inner portion of the first housing.

The reduction gear pertaining to a second aspect of the present invention is the reduction gear pertaining to the first aspect of the present invention, further comprising a bearing component. The bearing component is provided between the second housing and the first housing to rotate the first housing with respect to the second housing. The bearing component connects a first space in which the sealing component is disposed and a second space in which the reduction component is disposed, so that lubricating oil can flow through.

The reduction gear pertaining to a third aspect of the present invention is the reduction gear pertaining to the second aspect of the present invention, further comprising a plurality of communicating holes. The plurality of communicating holes are formed in the first housing and allow the first space to communicate with the second space.

The reduction gear pertaining to a fourth aspect of the present invention is the reduction gear pertaining to the third aspect of the present invention, wherein a plurality of the concave components are formed, and the plurality of communicating holes are provided opposite the plurality of concave components.

The reduction gear pertaining to a fifth aspect of the present invention is the reduction gear pertaining to the second aspect of the present invention, wherein the second housing has a cylindrical part, and a first opposing part. The cylindrical part has a horizontal center axis. The first opposing part is located more to the outside in the radial direction than the sealing component, and forms a gap opposite the first housing. The bearing component is disposed around the cylindrical part. The first housing has a cap part, a hub, and a cover. The cap part covers the distal end of the cylindrical part. The hub is provided on the outer peripheral side of the bearing component and is connected to sprocket teeth. The cover is provided on the opposite side of the hub from the cap part. The cover includes a second opposing part that forms the gap opposite the first opposing part. The first space is formed on the outside of the cylindrical part, and surrounded by the hub, the cover, the bearing component, and the second housing. The concave component is formed in a face of the cover that is opposite the hub.

The reduction gear pertaining to a sixth aspect of the present invention is the reduction gear pertaining to the fifth aspect of the present invention, wherein a plurality of the concave components are formed, and the plurality of concave components are formed on the same radius from the center axis. The various concave components are formed along the peripheral direction.

The reduction gear pertaining to a seventh aspect of the present invention is the reduction gear pertaining to the sixth aspect of the present invention, further comprising a plurality of communicating holes that are formed in the hub and that allow the first space to communicate with the second space. The plurality of communicating holes are formed at locations opposite the plurality of concave components.

The reduction gear pertaining to an eighth aspect of the present invention is the reduction gear pertaining to any of the second to seventh aspects of the present invention, wherein the driver is housed in the second housing. The reduction component is housed in the first housing. The second space is formed on the inside of the first housing. The first housing rotates around the output shaft.

The exemplary embodiments of the present invention provide a reduction gear with which lubricating oil can be supplied to the entire sealing component.

BRIEF DESCRIPTION OF DRAWINGS

FIGS. 6A to 6E show the hub of the final reduction gear in FIG. 2;

DETAILED DESCRIPTION OF THE EXEMPLARY EMBODIMENTS

The final reduction gear pertaining to an exemplary embodiment of the present invention will now be described through reference to the drawings.

Configuration

Overall Configuration of Bulldozer

Figure 1:
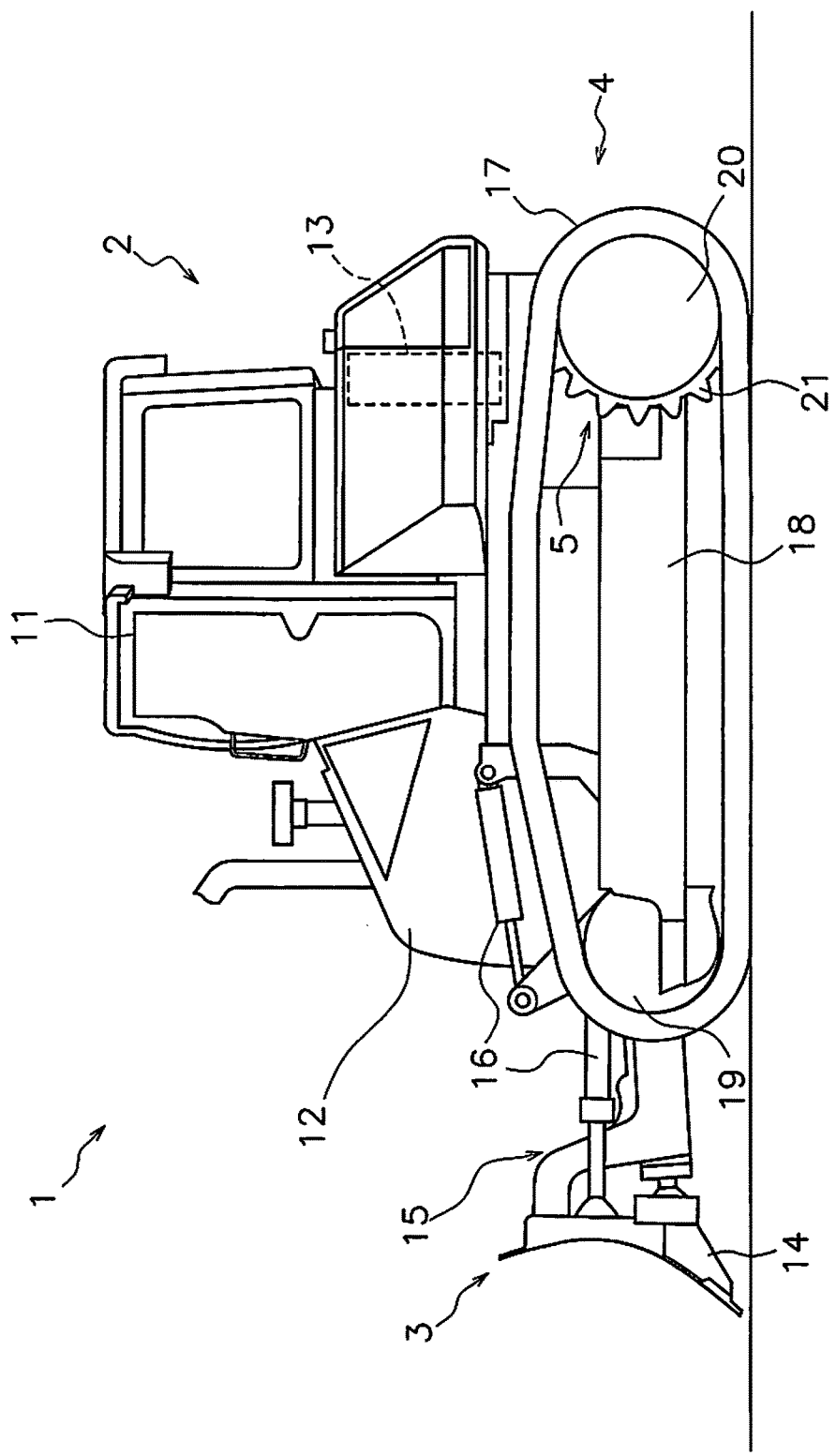
FIG. 1 is a side view of a bulldozer including a final reduction gear in an exemplary embodiment pertaining to the present invention.

FIG. 1 is a side view of a bulldozer 1 including the final reduction gear pertaining to this exemplary embodiment. The bulldozer 1 in this exemplary embodiment comprises a vehicle body 2, a work implement 3, and a drive unit 4.

The vehicle body 2 mainly includes a cab 11, an engine, a cooling unit 13, and so forth. Levers, pedals, and gauges for performing various operations, and a seat in which the operator of the work vehicle sits are installed in the cab 11. The engine is covered by an engine shroud 12 and is disposed ahead of the cab 11. The cooling unit 13 is disposed to the rear of the cab 11. The cooling unit 13 includes, for example, a radiator for cooling the cooling liquid of the engine, an oil cooler for cooling the lubricating oil, and a cooling fan for producing an air flow. In the following description, the term "longitudinal direction" means the longitudinal direction of the bulldozer 1. In other words, longitudinal direction means the forward and backward direction as seen from the operator seated in the cab 11. Also, the "left and right direction" means the left and right direction as seen from the operator seated in the cab 11. The "vehicle width direction" of the bulldozer 1 means either the above-mentioned left direction or right direction.

The work implement 3 is provided ahead of the engine shroud 12. The work implement 3 has a blade 14 and a blade drive mechanism 15. The blade drive mechanism 15 is provided with hydraulic cylinders 16, and the blade 14 is operated by the hydraulic cylinders 16.

Drive Unit

The drive unit 4 has crawler belts 17, track frames 18, idler tumblers 19, and sprocket wheels 5. The sprocket wheels 5 each have sprocket teeth 21 provided around the outer periphery, and a final reduction gear 20 (an example of a reduction gear) and a hydraulic motor 22 (see FIG. 2 described below) provided in the interior. The crawler belts 17 are provided on the left and right sides of the vehicle body 2, and these belts are endless. The track frames 18 are installed in the longitudinal direction of the vehicle. The idler tumblers 19 are rotatably supported at the front ends of the track frames 18. The final reduction gears 20 are fixed at the rear ends of the track frames 18. The sprocket teeth 21 are attached to the final reduction gears 20. The crawler belts 17 are wound around the idler tumblers 19 and the sprocket wheels 5.

The rotation of the hydraulic motor 22 is reduced in speed by the final reduction gear 20 and then transmitted to the sprocket teeth 21, which rotates the crawler belts 17 and drives the bulldozer 1.

Overview of Hydraulic Motor and Final Reduction Gear

Figure 2:
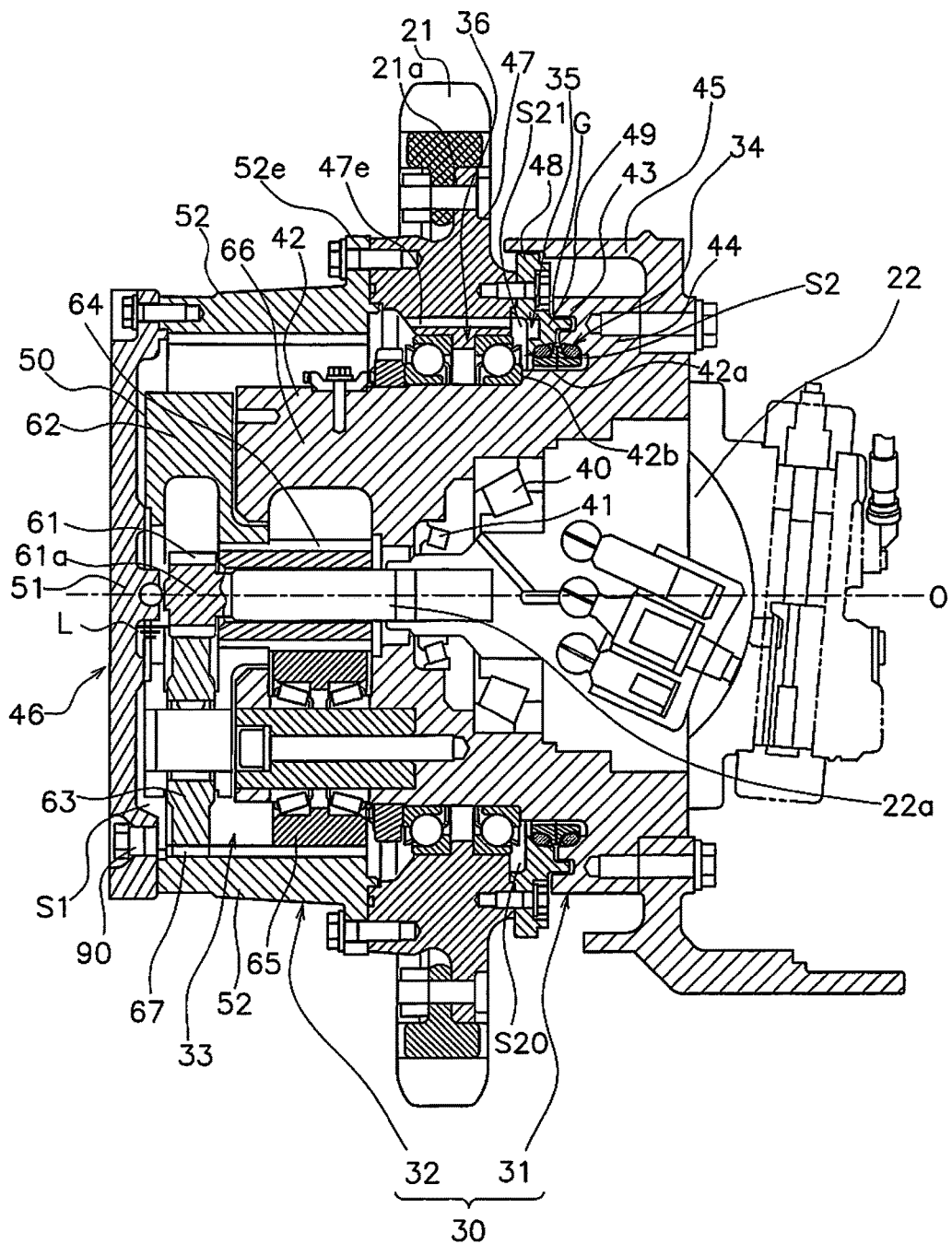
FIG. 2 is a cross section of the final reduction gear in FIG. 1.
Figure 3:
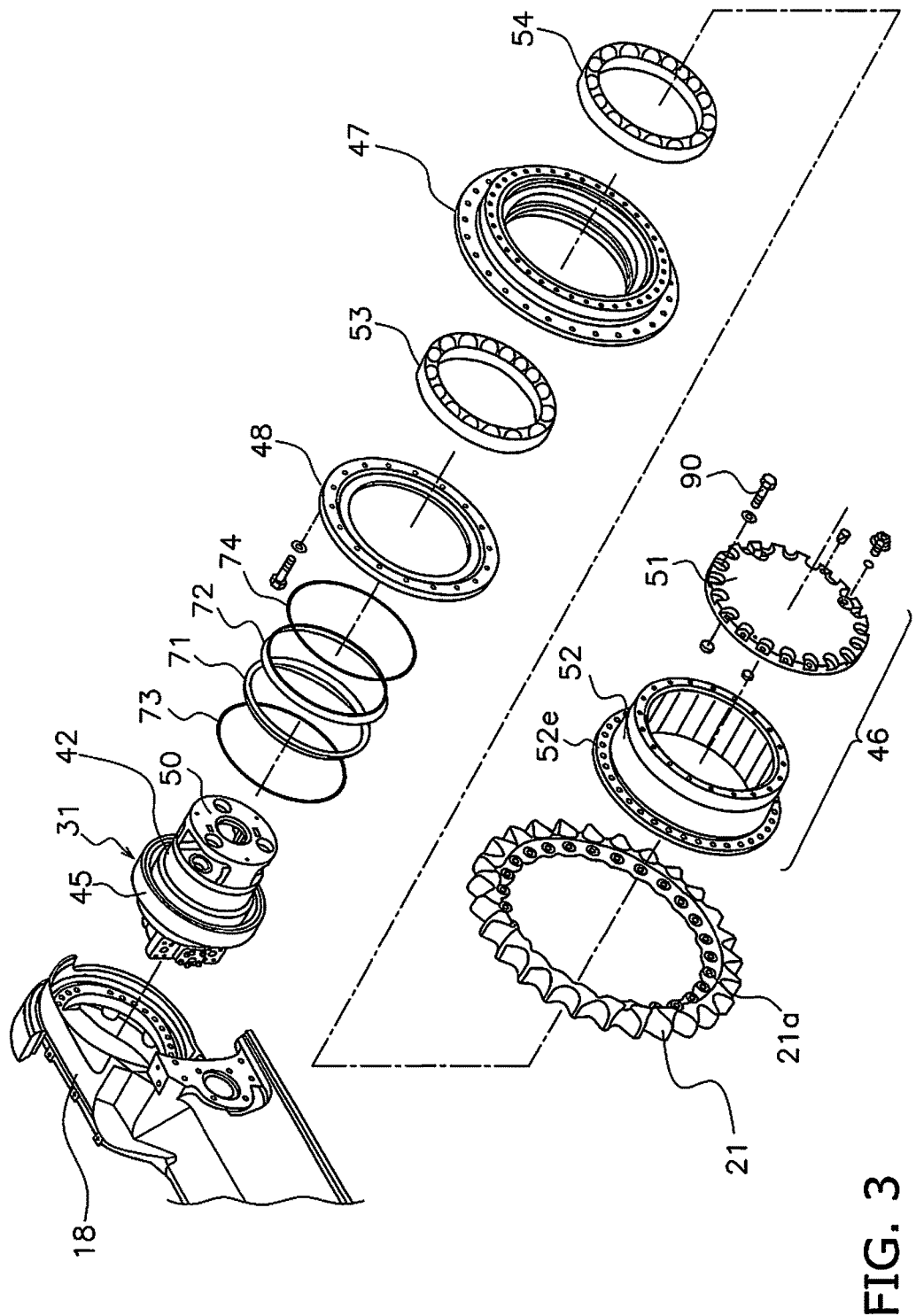
FIG. 3 is an exploded view of the main parts of the final reduction gear in FIG. 2.

FIG. 2 is a cross section of the final reduction gear 20 in this exemplary embodiment, as seen from the rear of the bulldozer 1. FIG. 3 is an exploded view of the layout of the main parts of the final reduction gear 20. In FIG. 3, the constituent parts of a reduction component 33 and other components are omitted as needed. In FIGS. 2 and 3 and the other drawings discussed below, the final reduction gear 20 on the left side is shown, so the left side in FIGS. 2 and 3 corresponds to the outside in the vehicle width direction, while the right side corresponds to the inside in the vehicle width direction. Here, the "outside in the vehicle width direction" means a direction moving away in the vehicle width direction from a center line extending in the longitudinal direction of the vehicle body 2 and passing through the width direction center in plan view, while the "inside in the vehicle width direction" means a direction moving toward this center line.

As shown in FIG. 2, each final reduction gear 20 in this exemplary embodiment mainly comprises a housing component 30, the reduction component 33, a sealing component 34, an oil splasher 35, a bearing component 36, and a plurality of communicating holes 47e.

The housing component 30 houses the hydraulic motor 22 and the reduction component 33. The housing component 30 has a stationary-side housing 31 and a rotating-side housing 32.

The hydraulic motor 22 is housed in the stationary-side housing 31. The stationary-side housing 31 rotatably supports the rotating-side housing 32. The reduction component 33 is housed in the rotating-side housing 32. The reduction component 33 reduces the speed of rotation of the hydraulic motor 22, and transmits the rotation to the rotating-side housing 32. The sealing component 34 seals a gap G between the stationary-side housing 31 and the rotating-side housing 32, and prevents lubricating oil from leaking out. The oil splasher 35 splashes the lubricating oil to the upper part of the sealing component 34. The bearing component 36 is disposed around the stationary-side housing 31, and allows the rotating-side housing 32 to rotate. The communicating holes 47e allow a housing space S1 in which the reduction component 33 is disposed to communicate with a seal disposition housing space S2 in which the sealing component 34 is disposed.

The above configuration will now be described in detail.

Stationary-Side Housing

Figure 4:
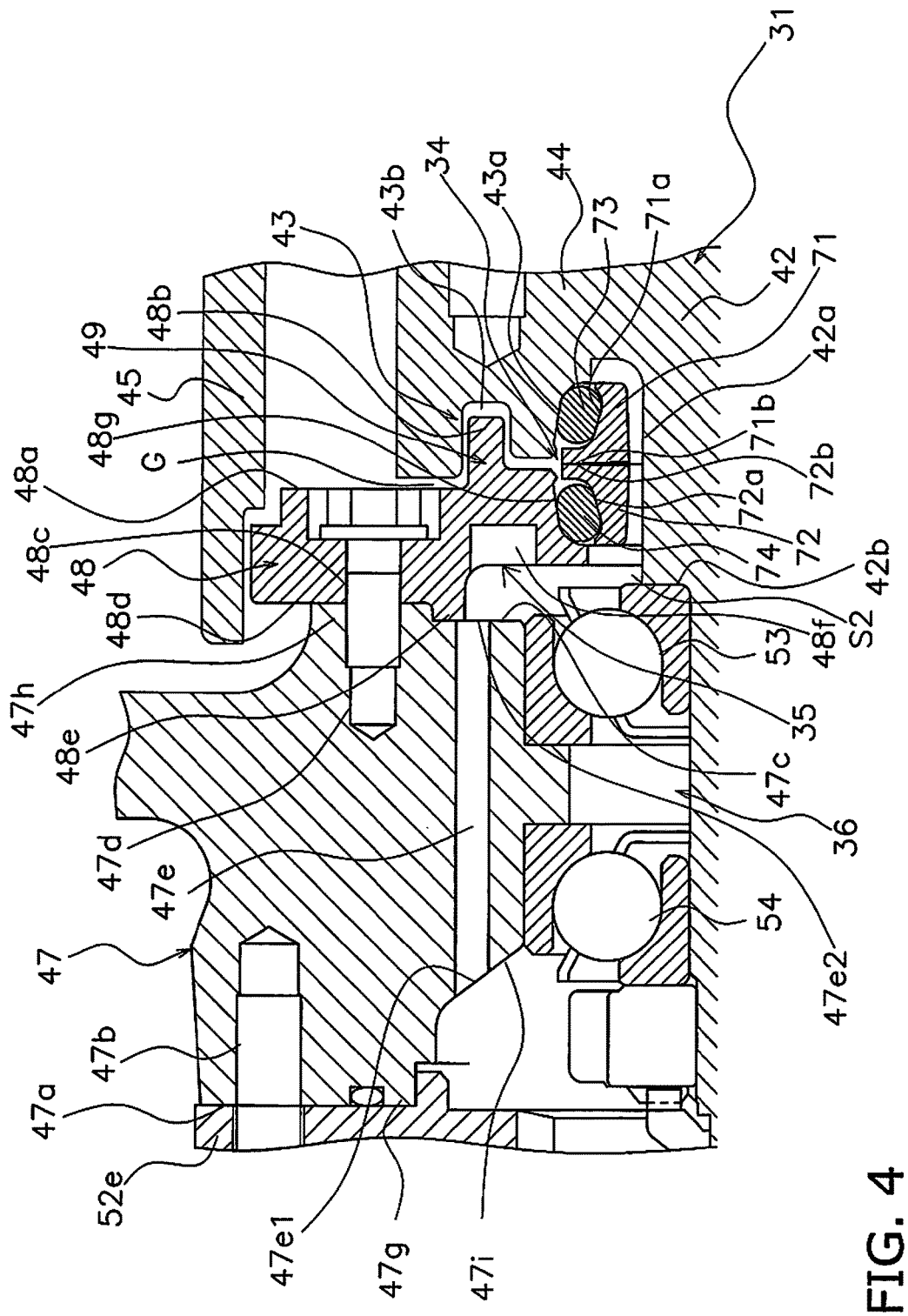
FIG. 4 is a cross section view of the area near the sealing component in FIG. 2.
Figure 5:
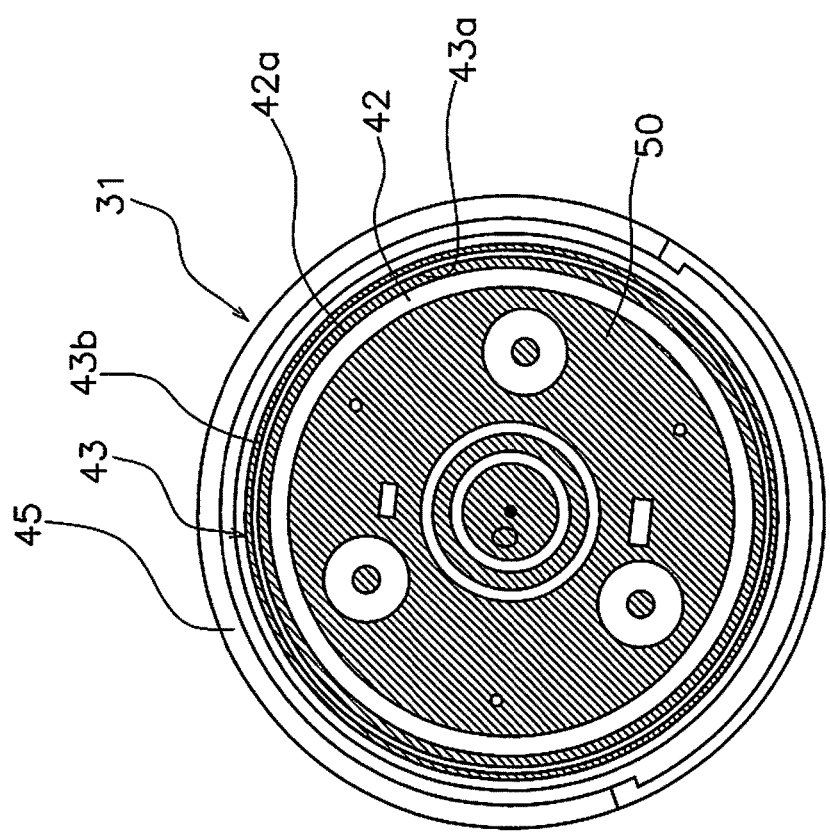
FIG. 5 is a front view of the stationary-side housing of the final reduction gear in FIG. 2, as seen from the outside in the vehicle width direction.

FIG. 4 is a detail view of FIG. 2, showing the area near the sealing component 34 (discussed below). FIG. 5 is a front view of the stationary-side housing 31 as seen from the outside in the vehicle width direction.

The stationary-side housing 31 is fixed to the track frame 18 (see FIG. 3), and houses the hydraulic motor 22. As shown in FIG. 2, the hydraulic motor 22 is disposed with its output shaft 22a horizontal. The stationary-side housing 31 rotatably supports the output shaft 22a of the hydraulic motor 22 via bearings 40 and 41.

The stationary-side housing 31 mainly has a cylindrical part 42, a stationary-side opposing part 43, a protruding part 44, an outer edge part 45, and a distal end face 50. The cylindrical part 42 is a cylindrical member having a horizontal center axis O, and covers the hydraulic motor 22. This center axis O coincides with the center of the output shaft 22a. The outside of the cylindrical part 42 in the vehicle width direction is closed off by the distal end face 50, in which openings are formed as shown in FIGS. 3 and 5. Openings are also formed near the distal end face 50 of the cylindrical part 42, and the constituent parts of the reduction component 33 (discussed below) are exposed through these openings. The "inside in the radial direction" and "outside in the radial direction" mentioned in the following description indicate the inside (the side toward the center axis O) and the outside (the side away from the center axis O) using the center axis O as a reference.

The protruding part 44 is formed to protrude to the outside in the radial direction from the cylindrical part 42, on the proximal end side of the cylindrical part 42. The protruding part 44 is formed all the way around the cylindrical part 42.

The stationary-side opposing part 43 is a portion that is opposite the rotating-side housing 32. The stationary-side opposing part 43 is formed to protrude toward the outside in the vehicle width direction from the protruding part 44. As shown in FIGS. 2 and 4, a space is formed between the inner peripheral face 43a of the stationary-side opposing part 43 and the outer peripheral face 42a of the cylindrical part 42, and this space constitutes part of the seal disposition housing space S2 in which the sealing component 34 is disposed (discussed below).

As shown in FIG. 4, the inner peripheral face 43a on the inside in the radial direction of the stationary-side opposing part 43 is inclined so that the diameter increases from the inside to the outside in the vehicle width direction. The stationary-side opposing part 43 has a groove 43b formed at its distal end part. The stationary-side opposing part 43 is formed in an annular shape, and the groove 43b is formed in an annular shape in this annular portion. In FIG. 5, the groove 43b is shown with hatching to make it stand out.

A protruding part 48b of the rotating-side housing 32 (discussed below) is inserted into this groove 43b, forming a so-called labyrinth structure.

The outer edge part 45 is located on the outside in the radial direction of the stationary-side opposing part 43 and the protruding part 44. The outer edge part 45 near the top in FIG. 2 is formed to cover the stationary-side opposing part 43 and the protruding part 44.

Rotating-Side Housing

The rotating-side housing 32 is a cylindrical member that is closed off at the distal end, and as shown in FIGS. 2 and 3, has a cap part 46, a hub 47, and a cover 48. The rotating-side housing 32 is provided to cover the stationary-side housing 31 from the outside. The center axis of the rotating-side housing 32 coincides with the center axis O of the stationary-side housing 31.

The cap part 46 covers the distal end of the stationary-side housing 31. More precisely, the cap part 46 has a disk-shaped first member 51 and a cylindrical second member 52. The first member 51 is disposed on an outer side in the vehicle wide direction of the stationary-side housing 31. The first member 51 is disposed so that its main face is substantially perpendicular to the output shaft 22a. The second member 52 is fixed to the first member 51 by bolts. A flange 52e that protrudes outward in the radial direction is formed at the end of the second member 52 on the inside in the vehicle width direction. The flange 52e is the portion that is connected to the hub 47.

The second member 52 is disposed to overlap the cylindrical part 42 of the stationary-side housing 31 as seen in a direction perpendicular to the center axis O.

Hub

The hub 47 is a portion of the rotating-side housing 32, and is disposed between the cap part 46 and the cover 48 in the center axis O direction.

The hub 47 is a cylindrical member used to support the sprocket teeth 21, and is disposed more to the inside in the vehicle width direction than the cap part 46. The hub 47 is bolted to the flange 52e of the cap part 46. The hub 47 is disposed via the bearing component 36 on the outer peripheral face of the cylindrical part 42. The hub 47 comprises the communicating holes 47e, which extend in the center axis O direction near the inner peripheral face. The communicating holes 47e allow the housing space S1 of the reduction component 33 to communicate with the seal disposition housing space S2.

Figure 7:
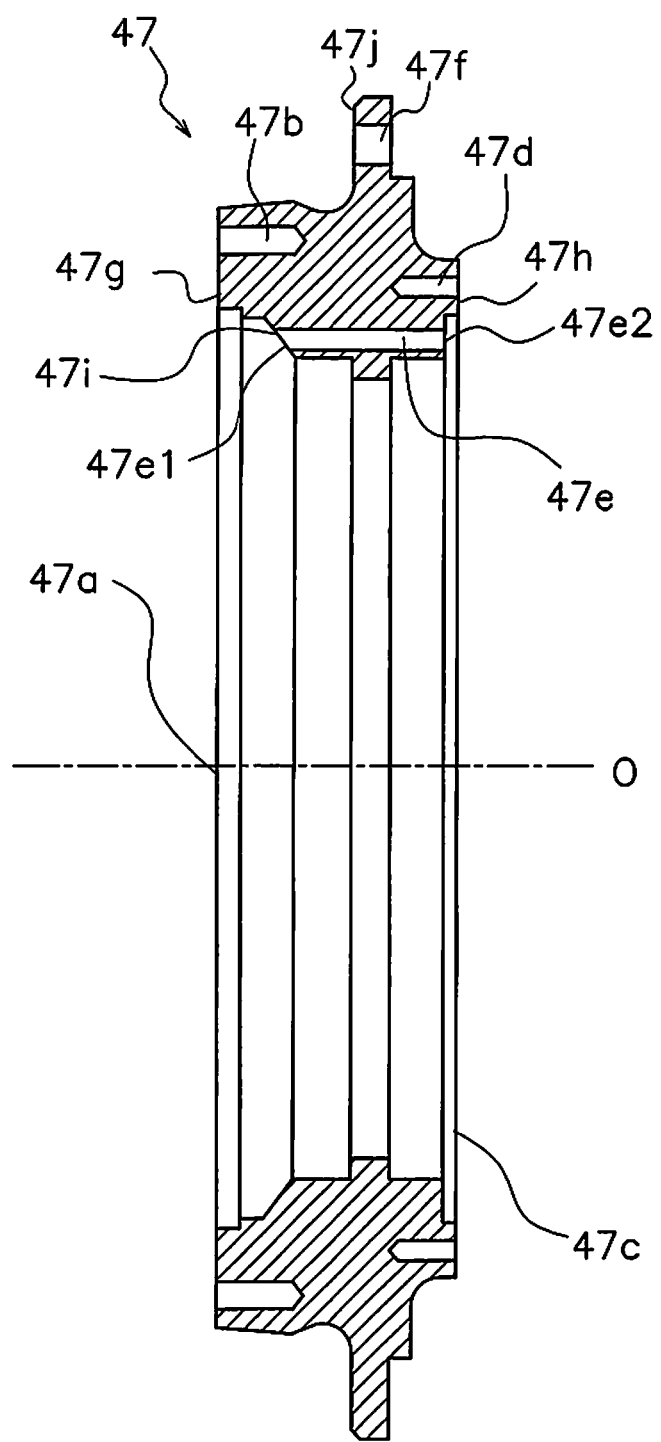
FIG. 7 is a cross section of the hub of the final reduction gear in FIG. 2.

FIGS. 6A and 6B are a plan view and an oblique view of the hub 47 as seen from the outside in the vehicle width direction. FIG. 6C is a view of the hub 47 as seen from the rear of the vehicle body. FIGS. 6D and 6E are a plan view and an oblique view of the hub 47 as seen from the inside in the vehicle width direction. FIG. 7 is a cross section of the hub 47 as seen from the rear of the vehicle body 2.

As shown in FIGS. 6A to 6C and FIG. 7, an annular contact component 47g that protrudes to the outside in the vehicle width direction is formed on the outer peripheral face 47a on the outside of the hub 47 in the vehicle width direction. This contact component 47g comes into contact with the flange 52e of the second member 52. A plurality of bolt holes 47b for connecting to the second member 52 are formed in the contact component 47g.

Also, an annular contact component 47h that protrudes to the inside in the vehicle width direction as shown in FIGS. 6C to 6E and FIG. 7 is formed on the inner peripheral face 47c on the inside of the hub 47 in the vehicle width direction. A plurality of bolt holes 47d for connecting to the cover 48 are formed in the contact component 47h.

A sloped face 47i is formed on the outer peripheral face 47a of the hub 47, on the inside in the radial direction of the contact component 47g. As shown in FIG. 4, this sloped face 47i does not come into contact with the cylindrical part 42 or the second member 52, and faces the housing space S1 (discussed below).

As shown in FIGS. 4 and 7, the communicating holes 47e that allow the sloped face 47i to communicate with the inner peripheral face 47c are formed in the hub 47. The openings of the communicating holes 47e in the sloped face 47i are labeled 47e1, while the openings of the communicating holes 47e in the inner peripheral face 47c are labeled 47e2. The communicating holes 47e are formed parallel to the center axis O. As shown in FIGS. 6A to 6E, a plurality of the communicating holes 47e are formed on the same radius, using the center axis O as a reference. The openings 47e2 are provided on the inside in the radial direction of the contact component 47h, in the inner peripheral face 47c.

As shown in FIGS. 6A-6E and 7, the outer peripheral edge 47j of the hub 47 is formed toward the outside in the radial direction, and the sprocket teeth 21 are attached. A plurality of bolt holes 47f formed parallel to the center axis O direction are provided to the outer peripheral edge 47j. Meanwhile, a plurality of bolt holes 21a are formed as shown in FIG. 3 in the sprocket teeth 21. The sprocket teeth 21 are bolted to the hub 47 through the bolt holes 21a.

Cover

The cover 48 is a member that covers the inside of the hub 47 in the vehicle width direction, and is bolted to the hub 47. The cover 48 has a rotating-side opposing part 49 on the inside in the vehicle width direction.

Figure 8:
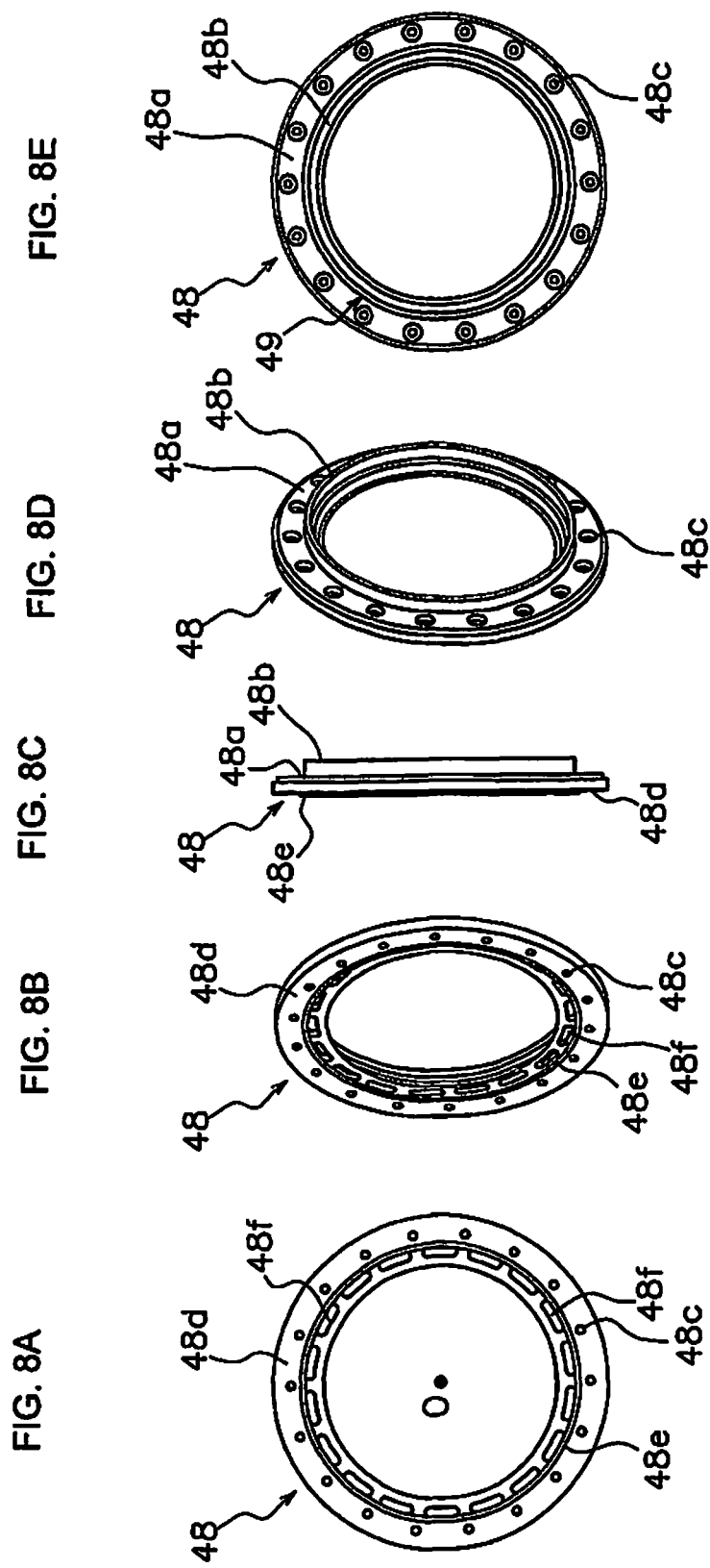
FIGS. 8A to 8E show the cover of the final reduction gear in FIG. 2.
Figure 9:
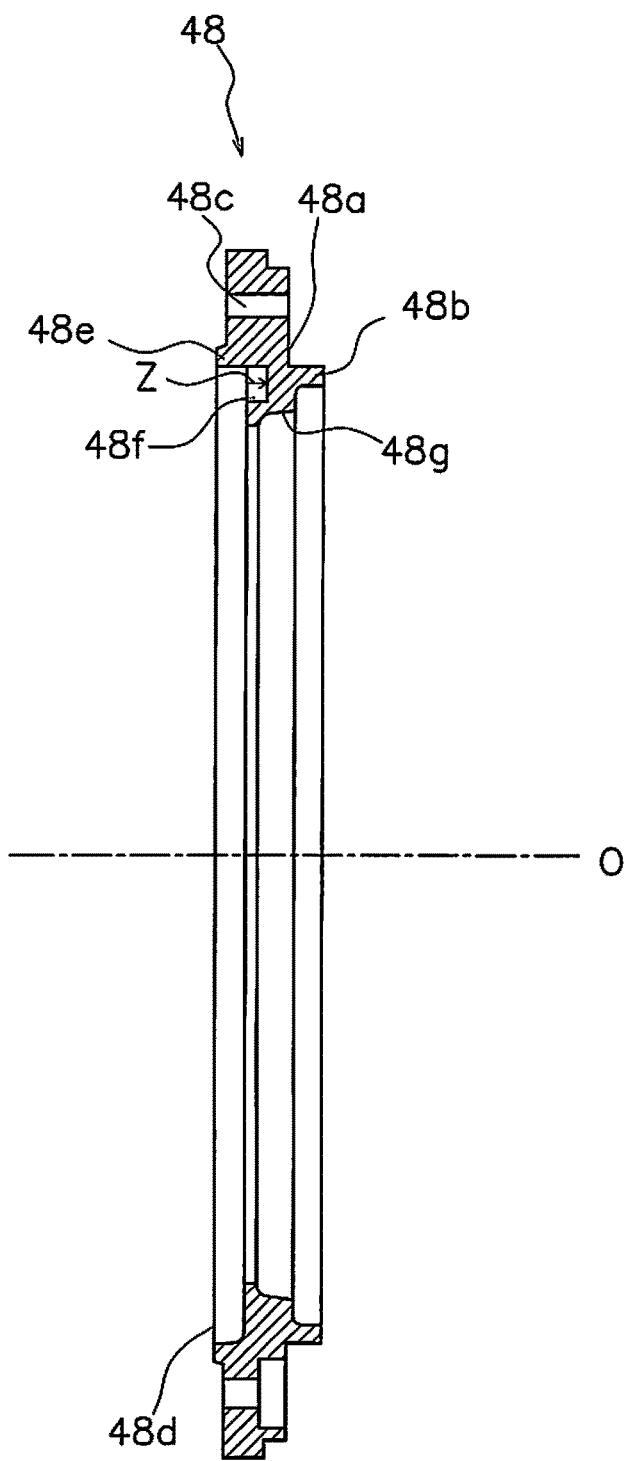
FIG. 9 is a cross section of the cover of the final reduction gear in FIG. 2.

FIGS. 8A and 8B are a plan view and an oblique view of the cover 48 as seen from the outside in the vehicle width direction. FIG. 8C is a view of the cover 48 as seen from the rear of the vehicle body. FIGS. 8D and 8E are a plan view and an oblique view of the cover 48 as seen from the inside in the vehicle width direction. FIG. 9 is a cross section of the cover 48 as seen from the rear of the vehicle body 2.

The cover 48 is annular in shape, and is disposed on the inside of the hub 47. The cover 48 forms the face of the rotating-side housing 32 that is opposite the protruding part 44 of the stationary-side housing 31. The sealing component 34 and the cylindrical part 42 of the stationary-side housing 31 are disposed on the inside in the radial direction of the cover 48. As shown in FIGS. 8C to 8E and FIG. 9, the annular protruding part 48b that protrudes to the inside in the vehicle width direction is formed on the inner peripheral face 48a on the inside of the cover 48 in the vehicle width direction. As shown in FIG. 4, the protruding part 48b is inserted in non-contact fashion in the groove 43b. The rotating-side opposing part 49 that is opposite the stationary-side opposing part 43 is formed by the protruding part 48b and the portions to the inside and outside of the protruding part 48b in the radial direction.

The stationary-side opposing part 43 and the rotating-side opposing part 49 are formed to overlap each other as seen in a direction perpendicular to the center axis O, which forms a labyrinth structure. The gap G is formed between the stationary-side opposing part 43 and the rotating-side opposing part 49, which are opposite each other in a direction parallel to the center axis O. This labyrinth structure prevents the intrusion of foreign matter into the inside of the final reduction gear 20.

A plurality of bolt holes 48c for bolting to the hub 47 are formed on the outside in the radial direction of the protruding part 48b. As shown in FIGS. 8A to 8C and FIG. 9, a protruding part 48e that protrudes to the outside in the vehicle width direction is formed on the inside in the radial direction of the bolt holes 48c, on the outer peripheral face 48d on the outside of the cover 48 in the vehicle width direction. The protruding part 48e is formed in an annular shape. The protruding part 48e comes into contact with the inner peripheral face 47c of the hub 47. A plurality of concave components 48f are formed along the protruding part 48e, on the inside in the radial direction of the protruding part 48e. The concave components 48f will be further described below.

As shown in FIGS. 4 and 9, an sloped face 48g is formed at the end on the inside in the radial direction of the inner peripheral edge of the cover 48. As shown in FIGS. 4 and 9, the sloped face 48g is inclined so that the diameter decreases from the inside toward the outside in the vehicle width direction.

Reduction Component

The reduction component 33 is housed in the housing space S1 formed on the inside of the rotating-side housing 32. As shown in FIG. 2, the reduction component 33 mainly has a first sun gear 61, a first planet carrier 62, a first planet gear 63, a second sun gear 64, a second planet gear 65, a second planet carrier 66, and a ring gear 67.

The first sun gear 61 is attached to a first sun gear shaft 61a provided to the end of the output shaft 22a of the hydraulic motor 22. The ring gear 67 is formed on the inner peripheral face of the second member 52 of the rotating-side housing 32. The first planet gear 63 meshes with the first sun gear 61 and the ring gear 67. The first planet carrier 62 rotatably supports the first planet gear 63. The first planet carrier 62 meshes with the second sun gear 64. The first sun gear 61, the first planet carrier 62, the first planet gear 63, and the ring gear 67 constitute a first-stage planetary reduction mechanism.

The second sun gear 64 is loosely fitted to the output shaft 22a. The second planet gear 65 meshes with the second sun gear 64 and the ring gear 67. The second planet carrier 66 rotatably supports the second planet gear 65. The second planet carrier 66 is formed integrally with the stationary-side housing 31. The second sun gear 64, the second planet gear 65, the second planet carrier 66, and the ring gear 67 constitute a second-stage planetary reduction mechanism.

The rotation of the output shaft 22a of the hydraulic motor 22 is reduced in speed by the reduction component 33, the rotation is transmitted to the rotating-side housing 32, and the rotating-side housing 32 rotates.

Lubricating oil L for lubricating the reduction component 33 is held in the housing space S1 in which the reduction component 33 is housed. The lubricating oil L is added up to approximately one-half the height of the rotating-side housing 32.

Sealing Component

The sealing component 34 is on the inside in the radial direction of the above-mentioned labyrinth structure, seals the gap G formed by the stationary-side opposing part 43 and the rotating-side opposing part 49, and prevents the lubricating oil L from leaking out.

As shown in FIG. 4, the sealing component 34 is disposed on the inside in the radial direction of the gap G. The sealing component 34 has a paired stationary-side sealing ring 71 and rotating-side sealing ring 72, and a paired stationary-side O ring 73 and rotating-side O ring 74.

The stationary-side O ring 73 is made of nitrile rubber and has a circular cross section. The stationary-side O ring 73 comes into contact with the above-mentioned inner peripheral face 43a of the stationary-side opposing part 43. The stationary-side sealing ring 71 is disposed on the inner peripheral side of the stationary-side O ring 73.

The rotating-side O ring 74 is made of nitrile rubber and has a circular cross section. The rotating-side O ring 74 comes into contact with the above-mentioned sloped face 48g of the cover 48. The rotating-side sealing ring 72 is disposed on the inner peripheral side of the rotating-side O ring 74.

The stationary-side sealing ring 71 is made of metal. The stationary-side sealing ring 71 has a sloped face 71a that is sloped to be opposite the inner peripheral face 43a and comes into contact with the stationary-side O ring, and a sliding face 71b that slides over the rotating-side sealing ring 72. The sliding face 71b is disposed substantially perpendicular to the center axis O.

The rotating-side sealing ring 72 is made of metal. The rotating-side sealing ring 72 has a sloped face 72a that is sloped to be opposite the sloped face 48g and comes into contact with the stationary-side O ring, and a sliding face 72b that slides over the stationary-side sealing ring 71. The sliding face 72b is disposed substantially perpendicular to the center axis O.

Since the sealing rings 71 and 72 have sliding faces that are raised up over the rotating parts via the rubber O rings 73 and 74, the sealing component 34 is called a floating seal. The above-mentioned sliding face 72b provides a sealing function.

When the rotating-side housing 32 is rotated by the drive of the hydraulic motor 22, the rotating-side O ring 74 and the rotating-side sealing ring 72 rotate along with the rotating-side housing 32. Meanwhile, the stationary-side O ring 73 and the stationary-side sealing ring 71 are fixed to the stationary-side housing 31. When the rotating-side sealing ring 72 rotates while sliding along the stationary-side sealing ring 71, the rotating-side housing 32 can rotate with respect to the stationary-side housing 31 in a state in which the seal is maintained.

Figure 10:
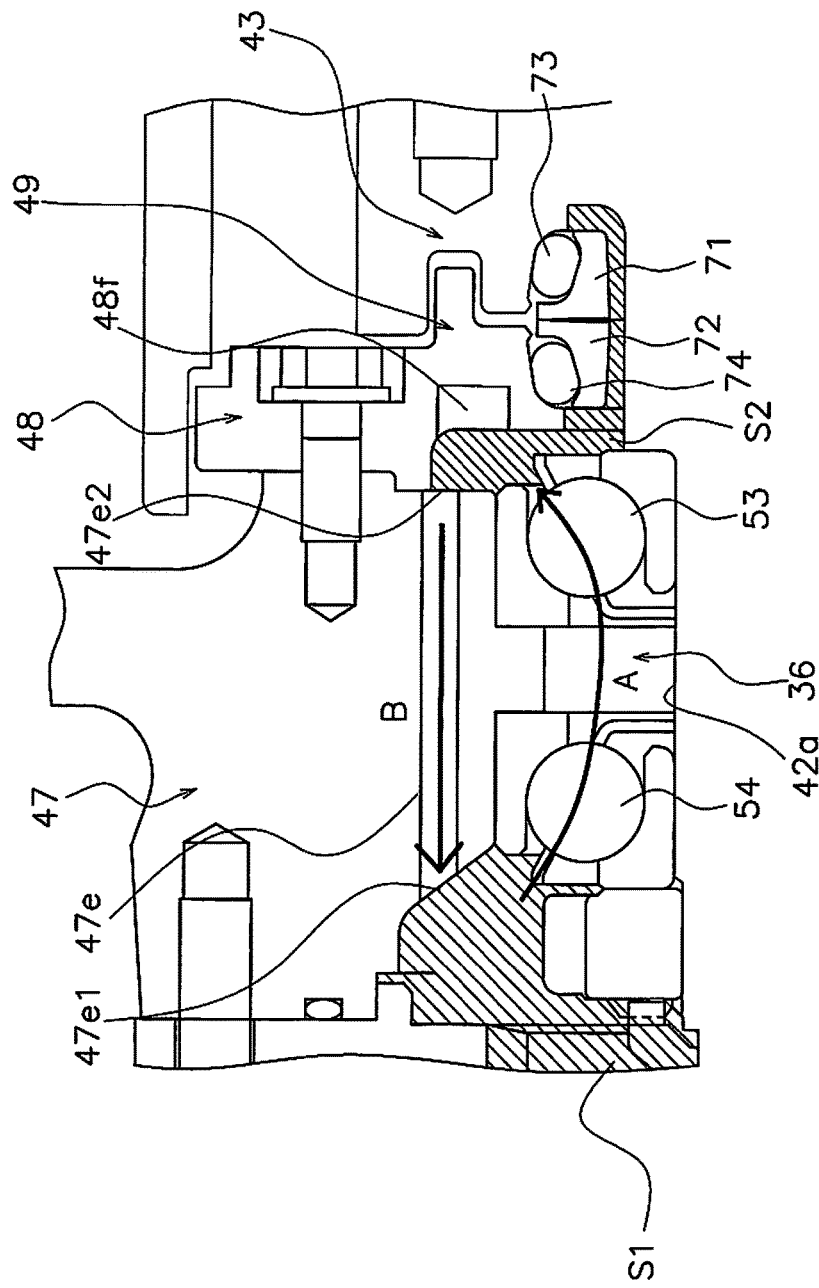
FIG. 10 is a detail view in partial cross section of the area near the sealing component in FIG. 2.

The sealing component 34 is disposed in the substantially annular seal disposition housing space S2 that is bounded by the cover 48, the hub 47, the bearing component 36 (discussed below), and the stationary-side housing 31 (and particularly the cylindrical part 42, the protruding part 44, and the stationary-side opposing part 43). FIG. 10 shows the seal disposition housing space S2. FIG. 10 is the same as FIG. 4, but hatching is applied to the seal disposition housing space S2 for the sake of illustration.

Bearing Component

As shown in FIGS. 2 to 4, the bearing component 36 mainly has a first bearing 53 and a second bearing 54.

The first bearing 53 and the second bearing 54 are disposed on the outer peripheral face 42a of the cylindrical part 42 of the stationary-side housing 31. The hub 47 is disposed on the outer peripheral side of the first bearing 53 and the second bearing 54.

The first bearing 53 is disposed on the inside of the hub 47 in the radial direction, on the end side on the inside of the hub 47 in the vehicle width direction. More precisely, as shown in FIG. 4, a step 42b is formed on the cylindrical part 42 near the inside of the stationary-side opposing part 43 in the radial direction, and the first bearing 53 comes into contact with this step 42b.

The second bearing 54 is disposed on the inside of the hub 47 in the radial direction, on the end side on the outside of the hub 47 in the vehicle width direction.

The bearing component 36 is such that the space formed by the stationary-side housing 31 and the rotating-side housing 32 is roughly divided into the seal disposition housing space S2 in which the sealing component 34 is disposed, and the housing space S1 in which the reduction component 33 is housed. In the bearing component 36, the seal disposition housing space S2 and the housing space S1 are connected so that the lubricating oil L can move between them.

Oil Splasher

As shown in FIG. 4, the oil splasher 35 is provided to the cover 48 to face the seal disposition housing space S2. The oil splasher 35 has a plurality of concave components 48f formed in the cover 48. As shown in FIGS. 4, 8A, 8B, and 9, the concave components 48f are formed on the inside in the radial direction of the protruding part 48e that is formed annularly on the outer peripheral face 48d. The concave components 48f are formed so that their depth direction Z (see FIG. 9) is parallel to the center axis O. The concave components 48f are formed in a plane extending in the radial direction, facing the interior of the rotating-side housing 32 of the cover 48. As shown in FIG. 4, the concave components 48f are provided on the outside in the radial direction of the sealing component 34. As shown in FIG. 8A, the concave components 48f are formed at the same radial distance all the way around the center axis O. The concave components 48f are each formed in a curved shape that follows the circumferential direction in front view.

Thus providing the concave components 48f at regular intervals in the peripheral direction forms the oil splasher 35 through a series of high and low places in an annular form. This repeating high and low annular pattern faces the seal disposition housing space S2.

Also, the concave components 48f are disposed to be opposite the above-mentioned communicating holes 47e. More precisely, the concave components 48f are opposite an opening 47e2 on the inner face 47c side of the communicating holes 47e.

Operation

The following description of the operation will focus on the flow of lubricating oil.

The lubricating oil L is added to a level of approximately one-half the height in the housing space S1 in which the reduction component 33 is housed in a stationary state in which the rotating-side housing 32 is not rotating. Accordingly, the lower space S20 out of the annular seal disposition housing space S2 (see FIG. 2) is always filled with the lubricating oil L.

In this state, when the hydraulic motor 22 is driven and the output shaft 22a is rotated, the speed of this rotation is reduced by the reduction component 33, the rotation is transmitted to the rotating-side housing 32, and the rotating-side housing 32 rotates.

The rotation of the rotating-side housing 32 also rotates the cover 48. In this rotation, the lubricating oil L in the lower space S20 (on the lower side in the seal disposition housing space S2) is splashed up to the upper space S21 (on the upper side) by the textured shape of the oil splasher 35. Accordingly, the lubricating oil L is supplied to the upper space S21, and the lubricating oil L is also supplied to the upper part of the sealing component 34 disposed in the upper space S21. Therefore, the lubricating oil L is supplied to the entire sealing component 34 disposed in the seal disposition housing space S2, which allows the sealing component 34 to be cooled. This extends the service life of the stationary-side O ring 73 and the rotating-side O ring 74 of the sealing component 34.

The lubricating oil L in the housing space S1 is supplied by the rotation of the rotating-side housing 32 to the seal disposition housing space S2 via the bearing component 36, as indicated by the arrow A in FIG. 10. The lubricating oil L supplied to the seal disposition housing space S2 goes back through the communicating holes 47e to the housing space S1 (see the arrow B). Thus, providing the communicating holes 47e makes it easier for the lubricating oil L to go out of the seal disposition housing space S2 to the housing space S1 side. Therefore, the lubricating oil L will more easily flow from the housing space S1 to the seal disposition housing space S2 side.

Specifically, a path is formed over which the lubricating oil L circulates between the housing space S1 and the seal disposition housing space S2 (arrows A and B), so even when the seal disposition housing space S2 is small, the lubricating oil L will still be supplied into the seal disposition housing space S2.

In FIG. 10, it shows the lubricating oil L flowing through the bearing component 36 into the seal disposition housing space S2, and flowing out of the communicating holes 47e, but depending on the speed of rotation, the interior shape, and so forth, it is also possible that the lubricating oil L will flow through the communicating holes 47e into the seal disposition housing space S2, and through the bearing component 36 into the housing space S1. In other words, forming a circulation path makes it easier for the lubricating oil L to flow into the seal disposition housing space S2.

Main Features

The final reduction gear 20 in this exemplary embodiment (an example of a reduction gear) comprises the housing component 30, the reduction component 33, the sealing component 34, and the concave components 48f. The housing component 30 has the rotating-side housing 32 (an example of a first housing) that is rotated horizontally around the center axis O (an example of the rotational axis) by the rotation of the output shaft 22a of the hydraulic motor 22 (an example of a driver), and the stationary-side housing 31 (an example of a second housing) that rotatably supports the rotating-side housing 32. The reduction component 33 reduces the rotational speed of the hydraulic motor 22, transmits the rotation of the rotating-side housing 32, and is housed in the housing component 30. The sealing component 34 is disposed between the rotating-side housing 32 and the stationary-side housing 31. The concave components 48f are disposed more to the outside in the radial direction than the sealing component 34, are spatially linked to the rotating-side housing 32 side of the sealing component 34, and are formed in the inner portion of the rotating-side housing 32.

As shown in FIG. 2, because the oil splasher 35 is provided, the lubricating oil L held in the lower space S20 (part of the seal disposition housing space S2) can be splashed up to the upper space S21 (part of the seal disposition housing space S2). This allows the lubricating oil L to be supplied to the upper part of the sealing component 34 disposed in the seal disposition housing space S2. Therefore, the lubricating oil L can be supplied to the entire sealing component 34.

Also, a plurality of the concave components 48f are formed as the configuration for splashing up the oil. The concave components 48f can be formed even when the space in which the sealing component 34 is disposed is small, so the lubricating oil L can be supplied to the upper part of the sealing component 34 as well.

The final reduction gear 20 in this exemplary embodiment further comprises the bearing component 36. The bearing component 36 is provided between the stationary-side housing 31 and the rotating-side housing 32 to rotate the rotating-side housing 32 with respect to the stationary-side housing 31. The bearing component 36 connects the housing space S1 (an example of a second space) in which the reduction component 33 is disposed, and the seal disposition housing space S2 (an example of a first space) in which the sealing component 34 is disposed, so that the lubricating oil L is able to flow between these spaces.

The seal disposition housing space S2 is connected through the bearing component 36 to the housing space S1 in which the reduction component 33 is housed, but when the seal disposition housing space S2 is small, then it will be difficult to supply the lubricating oil L from the housing space S1 to the upper part of the seal disposition housing space S2. However, providing the oil splasher 35 as above allows the lubricating oil L to be supplied to the upper part of the sealing component 34 as well.

The final reduction gear 20 in this exemplary embodiment further comprises a plurality of the communicating holes 47e. The communicating holes 47e are formed in the rotating-side housing 32, and allow the seal disposition housing space S2 to communicate with the housing space S1.

Consequently, as shown in FIG. 10, a path is formed for the lubricating oil L to return from the seal disposition housing space S2 to the housing space S1, so even when the seal disposition housing space S2 should be small, the lubricating oil will be easily supplied from the housing space S1 toward the seal disposition housing space S2. Specifically, since a path for the lubricating oil L to circulate is formed by the communicating holes 47e along with the bearing component 36, the seal disposition housing space S2 will not become a dead end, and the lubricating oil L will be supplied more easily through the bearing component 36 to the seal disposition housing space S2.

With the final reduction gear 20 in this exemplary embodiment, a plurality of the concave components 48f are formed, and a plurality of the communicating holes 47e are provided opposite the concave components 48f. Consequently, it is easier for the lubricating oil L that has been splashed up to return to the housing space S1 through the communicating holes 47e, so the lubricating oil L circulates more freely, and the sealing component 34 is cooled more effectively.

With the final reduction gear 20 in this exemplary embodiment, the stationary-side housing 31 has the cylindrical part 42 and the stationary-side opposing part 43 (an example of a first opposing part). The cylindrical part 42 has the center axis O in the horizontal direction. The stationary-side opposing part 43 is located more to the outside in the radial direction than the sealing component 34, and forms the gap G opposite the rotating-side housing 32. The bearing component 36 is disposed around the cylindrical part 42. The rotating-side housing 32 has the cap part 46, the hub 47, and the cover 48. The cap part 46 covers the distal end of the cylindrical part 42. The hub 47 is provided to the outer peripheral side of the bearing component 36, and is connected to the sprocket teeth 21. The cover 48 is provided to the opposite side of the hub 47 from the cap part 46. The cover 48 includes the rotating-side opposing part 49 (an example of a second opposing part) that forms the gap G and is opposite the stationary-side opposing part 43. The seal disposition housing space S2 is formed on the outside of the cylindrical part 42, surrounded by the cover 48, the hub 47, the bearing component 36, and the stationary-side housing 31. The concave components 48f are formed on the outer peripheral face 48d of the cover 48 opposite the hub 47.

Consequently, the lubricating oil L can be supplied to the upper part of the sealing component 34 disposed in the seal disposition housing space S2 formed on the inside of the hub 47 in the vehicle width direction. Therefore, the lubricating oil L can be supplied to the entire sealing component 34.

With the final reduction gear 20 in this exemplary embodiment, a plurality of the concave components 48f are formed, and the concave components 48f are formed on the same radius from the center axis O. The concave components 48f are formed along the circumferential direction.

Consequently, the lubricating oil L held in the lower space S20 (part of the seal disposition housing space S2) can be splashed up to the upper space S21 (part of the seal disposition housing space S2) and supplied to the upper part of the sealing component 34.

With the final reduction gear 20 in this exemplary embodiment, the hydraulic motor 22 is housed in the stationary-side housing 31. The reduction component 33 is housed in the rotating-side housing 32. The housing space S1 is formed inside the rotating-side housing 32. The rotating-side housing 32 rotates around the output shaft 22a.

With an HST (hydrostatic transmission) type of reduction gear such as this, since the hydraulic motor 22 is housed in the stationary-side housing 31 of the final reduction gear 20, restrictions, such as piping, often make the seal disposition housing space S2 small, so it is harder for the lubricating oil L to be supplied to the upper part of the sealing component 34. Accordingly, the configuration of this exemplary embodiment will be more effective with an HST type of reduction gear.

Other Exemplary Embodiments

An exemplary embodiment of the present invention was described above, but the present invention is not limited to or by this exemplary embodiment, and various modifications are possible without departing form the gist of the invention.

Figure 11A:
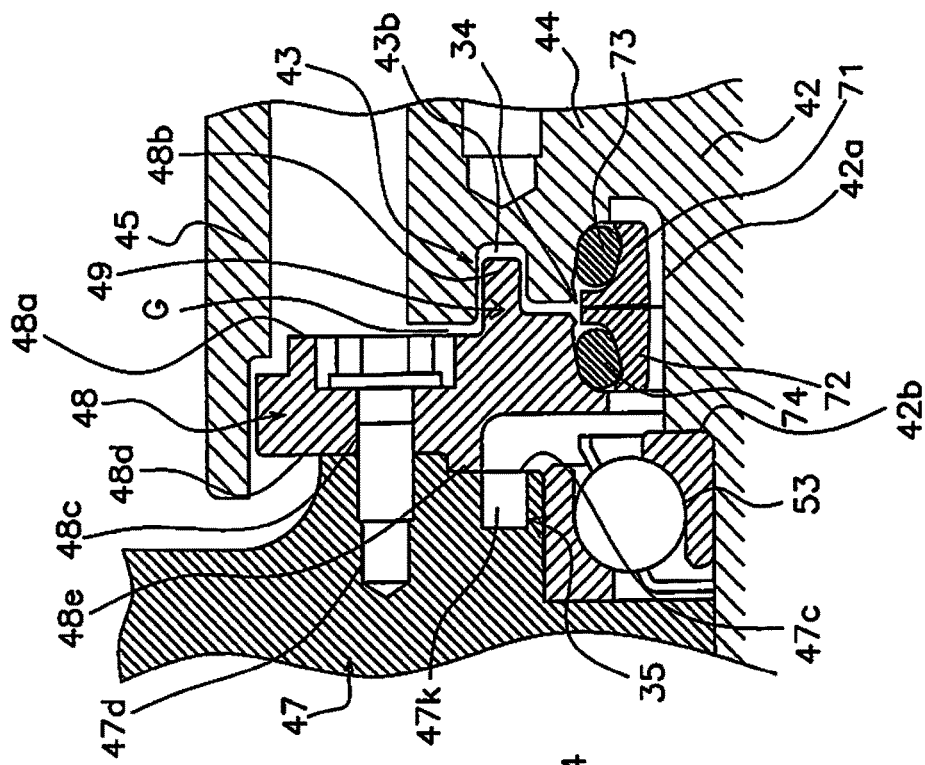
FIGS. 11A and 11B are cross sections of the final reduction gear in another exemplary embodiment pertaining to the present invention.

In the above exemplary embodiment, the oil splasher 35 has a plurality of the concave components 48f formed on the outer peripheral face 48d of the cover 48, but the concave components 48f need not be formed on the outer peripheral face 48d. As shown in FIG. 11A, the concave components 48f may be formed on the inside of the protruding part 48e in the radial direction. These concave components 48f are formed so that their depth direction will be perpendicular to the center axis O.

Figure 11B:
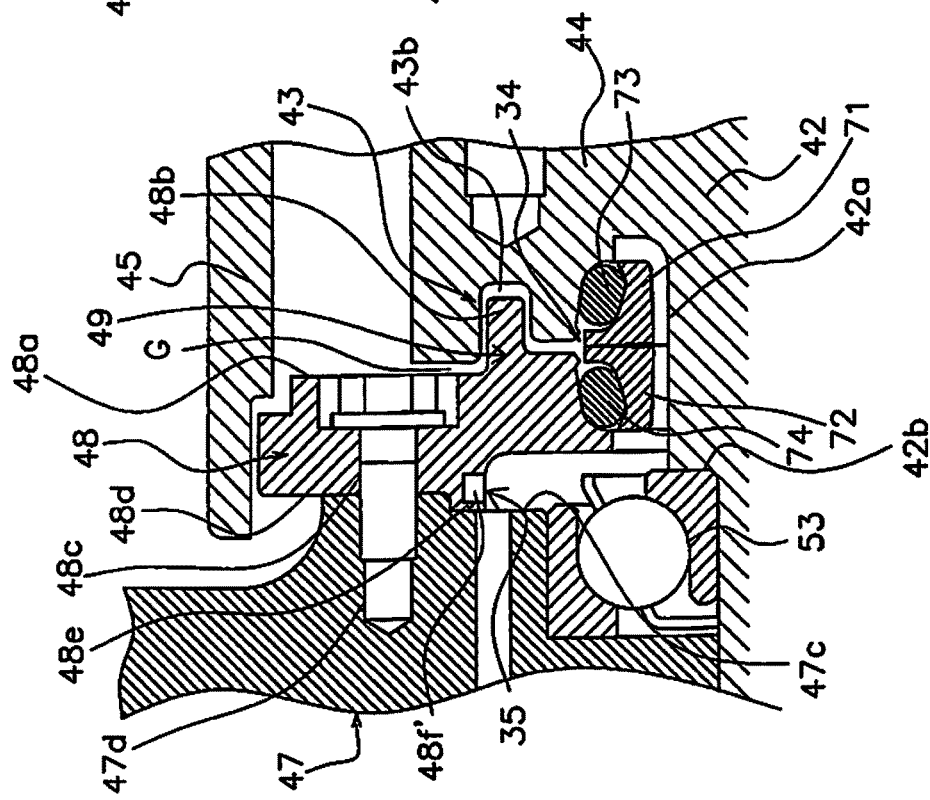

In the above exemplary embodiment, the oil splasher 35 was provided to the cover 48, but may instead be provided to the hub 47 as shown in FIG. 11B. In this case, a plurality of concave components 47k are formed at positions facing the seal disposition housing space S2, in the inner peripheral face 47c of the hub 47. These concave components 47k are provided between the communicating holes 47e. For example, the communicating holes 47e and the concave components 48f are disposed in an alternating pattern.

In the above exemplary embodiment, the communicating holes 47e are formed horizontally and parallel to the center axis O, but may instead be inclined. For instance, the communicating holes 47e may be formed so that the opening 47e1 side is located more to the outer peripheral side than the opening 47e2 side.

In the above exemplary embodiment, a configuration in which the final reduction gear 20 comprised the oil splasher 35 and the communicating holes 47e in a hydrostatic continuously variable transmission (HST) was described, but the above-mentioned oil splasher 35 and communicating holes 47e may instead be provided to the reduction gear of a hydrostatic steering system (HSS).

In the above exemplary embodiment, the bulldozer 1 was used as an example of a work vehicle, but the present invention is not limited to a bulldozer, and a hydraulic excavator or the like may be used instead, for example.

The reduction gear pertaining to exemplary embodiments of the present invention have the effect of allowing lubricating oil to be supplied all the way around a sealing component, and can be widely applied as a final reduction gear for a bulldozer, a hydraulic excavator, or other such work vehicles.

The invention claimed is:

1. A reduction gear, comprising:
a housing component having a first housing that is rotated around a horizontal rotation axis by rotation of an output shaft of a driver, and a second housing that rotatably supports the first housing;
a reduction component that is housed in the housing component, reduces the rotational speed of the driver, and transmits the rotation to the first housing;
a sealing component that is disposed between the first housing and the second housing; and
a concave component that is formed in an inner portion of the first housing such that the concave component does not extend through the first housing, the concave component being located radially outward of the sealing component, the concave component being spatially linked to the first housing side of the sealing component.

2. The reduction gear according to claim 1, further comprising
a bearing component that is provided between the second housing and the first housing to rotate the first housing with respect to the second housing,
the bearing component connecting a first space in which the sealing component is disposed and a second space in which the reduction component is disposed, so that lubricating oil can flow through.

3. The reduction gear according to claim 2, wherein
the driver is housed in the second housing,
the reduction component is housed in the first housing,
the second space is formed on the inside of the first housing, and
the first housing rotates around the output shaft.

4. A reduction gear, comprising:
a housing component having a first housing that is rotated around a horizontal rotation axis by rotation of an output shaft of a driver, and a second housing that rotatably supports the first housing;
a reduction component that is housed in the housing component, reduces the rotational speed of the driver, and transmits the rotation to the first housing;
a sealing component that is disposed between the first housing and the second housing;
a concave component that is located radially outward of the sealing component, is spatially linked to the first housing side of the sealing component, and is formed in an inner portion of the first housing;
a bearing component that is provided between the second housing and the first housing to rotate the first housing with respect to the second housing, the bearing component connecting a first space in which the sealing component is disposed and a second space in which the reduction component is disposed, so that lubricating oil can flow through; and
a plurality of communicating holes that are formed in the first housing and that allow the first space to communicate with the second space.

5. The reduction gear according to claim 4, wherein
a plurality of the concave components are formed, and
the plurality of communicating holes are provided opposite the plurality of concave components.

6. The reduction gear according to claim 4, wherein
the driver is housed in the second housing,
the reduction component is housed in the first housing,
the second space is formed on the inside of the first housing, and
the first housing rotates around the output shaft.

7. A reduction gear, comprising:
a housing component having a first housing that is rotated around a horizontal rotation axis by rotation of an output shaft of a driver, and a second housing that rotatably supports the first housing;
a reduction component that is housed in the housing component, reduces the rotational speed of the driver, and transmits the rotation to the first housing;
a sealing component that is disposed between the first housing and the second housing;
a concave component that is located radially outward of the sealing component, is spatially linked to the first housing side of the sealing component, and is formed in an inner portion of the first housing; and a bearing component that is provided between the second housing and the first housing to rotate the first housing with respect to the second housing, the bearing component connecting a first space in which the sealing component is disposed and a second space in which the reduction component is disposed, so that lubricating oil can flow through, the second housing including a cylindrical part having a horizontal center axis; and a first opposing part that is located radially outward of the sealing component, and that forms a gap opposite the first housing, the bearing component being disposed around the cylindrical part, and the first housing including a cap part that covers a distal end of the cylindrical part;

a hub that is provided on an outer peripheral side of the bearing component and is connected to sprocket teeth; and a cover that includes a second opposing part that forms the gap opposite the first opposing part, and that is provided on an opposite side of the hub from the cap part, the first space being formed on an outside of the cylindrical part, and surrounded by the hub, the cover, the bearing component, and the second housing, and the concave component being formed in a face of the cover that is opposite the hub.

8. The reduction gear according to claim 7, wherein a plurality of the concave components are formed, the plurality of concave components are formed on the same radius from the center axis, and the plurality of concave components are formed along a peripheral direction.

9. The reduction gear according to claim 8, further comprising a plurality of communicating holes that are formed in the hub and that allow the first space to communicate with the second space, the plurality of communicating holes are being formed at locations opposite the plurality of concave components.

10. The reduction gear according to claim 7, wherein the driver is housed in the second housing, the reduction component is housed in the first housing, the second space is formed on the inside of the first housing, and the first housing rotates around the output shaft.

* * * * *